United States Patent
Zhang

(10) Patent No.: US 10,606,225 B2
(45) Date of Patent: Mar. 31, 2020

(54) MOTOR DRIVE SYSTEM, MOTOR CONTROL SYSTEM, AND SELF-PROPELLED ROBOT

(71) Applicant: Nidec Corporation, Kyoto (JP)

(72) Inventor: Gang Zhang, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 2 days.

(21) Appl. No.: 16/194,481

(22) Filed: Nov. 19, 2018

(65) Prior Publication Data

US 2019/0086885 A1 Mar. 21, 2019

Related U.S. Application Data

(63) Continuation of application No. PCT/JP2017/007834, filed on Feb. 28, 2017.

(30) Foreign Application Priority Data

May 25, 2016 (JP) .................. 2016-104065

(51) Int. Cl.
*H02P 21/00* (2016.01)
*G05B 15/02* (2006.01)
(Continued)

(52) U.S. Cl.
CPC ......... *G05B 15/02* (2013.01); *G05B 19/4141* (2013.01); *G06F 9/48* (2013.01);
(Continued)

(58) Field of Classification Search
CPC .............. G05B 19/4141; G05B 2219/33213
See application file for complete search history.

(56) References Cited

U.S. PATENT DOCUMENTS

| 8,963,453 B2 * | 2/2015 | Hong ................ H02P 27/08 318/41 |
| 2004/0160201 A1 | 8/2004 | Rahman et al. |

(Continued)

FOREIGN PATENT DOCUMENTS

| JP | 2004-248495 A | 9/2004 |
| JP | 2004-536538 A | 12/2004 |

(Continued)

OTHER PUBLICATIONS

Official Communication issued in International Patent Application No. PCT/JP2017/007834, dated May 30, 2017.
(Continued)

*Primary Examiner* — Karen Masih
(74) *Attorney, Agent, or Firm* — Keating & Bennett

(57) ABSTRACT

A motor drive system of the present disclosure includes a first motor unit having a first processor, and a second motor unit having a second processor, which are connected together by a communication line. The first processor sends data at regular intervals P1. The second processor receives the data at the regular intervals P1 from first time, and executes a task operating based on the data at regular intervals P2 from second time as a starting point. In a synchronization mode, the second processor changes the second time to new second time that occurs within a predetermined allowable time from the first time. In a normal operation mode, the first processor sends data via the communication line at the regular intervals P1, and the second processor executes the task operating based on the data at the regular intervals P2 from the new second time as a starting point.

12 Claims, 14 Drawing Sheets

(51) Int. Cl.
G06F 9/48 (2006.01)
H02P 5/46 (2006.01)
G05B 19/414 (2006.01)

(52) U.S. Cl.
CPC ...... *H02P 5/46* (2013.01); *G05B 2219/33213* (2013.01); *G05D 2201/02* (2013.01)

(56) References Cited

U.S. PATENT DOCUMENTS

| | | |
|---|---|---|
| 2005/0013394 A1 | 1/2005 | Rausch et al. |
| 2011/0274192 A1 | 11/2011 | Wei et al. |

FOREIGN PATENT DOCUMENTS

| | | |
|---|---|---|
| JP | 2005-354856 A | 12/2005 |
| JP | 2012-516079 A | 7/2012 |

OTHER PUBLICATIONS

Vector Corporation, "Time Synchronization to FlexRay in OSEKtime and Autosar OS", Vector Informatik GmbH, Feb. 22, 2007, 12 pages.

* cited by examiner

MOTOR DRIVE SYSTEM, MOTOR CONTROL SYSTEM, AND SELF-PROPELLED ROBOT

This is a continuation of International Application No. PCT/JP2017/007834, with an international filing date of Feb. 28, 2017, which claims priority of Japanese Patent Application No. 2016-104065, filed on May 25, 2016, the entire contents of which are hereby incorporated by reference.

BACKGROUND

1. Technical Field

The present disclosure relates to techniques of adjusting a timing at which each processor starts a task in a multiprocessor environment. More specifically, the present disclosure relates to a technique of adjusting the timing of starting a task in the case where a plurality of processors exchanging data with each other execute tasks using data to control separate motors.

2. Description of the Related Art

Real-time systems are required to, when instructed to execute a job, execute and end the job according to schedule. Real-time systems need to manage time at the millisecond or microsecond scale, for example.

As an embodiment of such real-time systems, known are real-time distributed systems each including a plurality of interconnected processors. Efforts have in recent years been under way, particularly in the automotive and robot fields, to develop a real-time distributed system in which a plurality of processors each control a motor and/or a machine in corporation with each other.

In real-time distributed systems, one processor sends data to another processor, and the second processor executes a job using the received data. For example, Vector Corporation, "Time Synchronization to FlexRay in OSEK time and Autosar OS" describes a real-time distributed system performing TDMA communication. In this real-time distributed system, all processors communicate with each other by TDMA communication in order to exchange data. Each processor has a scheduling table synchronous with TDMA communication. Taking into account all communication delays between the processors and execution times of the processors, each task is accurately placed on the scheduling table so that the entire system operates in a well-organized sequence.

Japanese National Phase PCT Laid-Open Patent Publication No. 2012-516079 describes a method for synchronizing all distributed modules (i.e., all processors) in a real-time distributed system so that all the modules start at the same timing. Specifically, in this real-time distributed system, all the distributed modules are given the same timing information (e.g., a clock).

Japanese National Phase PCT Laid-Open Patent Publication No. 2004-536538 describes a method for adjusting the phases and frequencies of the module clocks of a plurality of distributed modules included in a real-time distributed system if communication is possible between any two of the modules.

SUMMARY

If a complex mechanism that causes processors to communicate with each other by TDMA communication, or gives timing information to each processor, is introduced to a system, the cost of the system increases. There is a demand for a real-time distributed system that can be implemented at lower cost.

Note that in low-cost systems, processors may operate with different clocks, or software applications for operating the processors may have different configurations, resulting in a situation that the operations of the processors may not be synchronized.

The present disclosure provides a real-time distributed system in which tasks are executed in a synchronized manner between a plurality of processors connected together by a communication line, whereby the real-time distributed system is operated at required timings.

An illustrative first motor drive system according to the present disclosure includes a first motor unit having a first motor and a first processor to control the first motor, and a second motor unit having a second motor and a second processor to control the second motor. The first motor unit and the second motor unit are connected together by a communication line. The first processor sends data via the communication line at regular intervals P1. The second processor receives the data via the communication line at the regular intervals P1 from first time. The second processor executes a task operating based on the data at regular intervals P2 from second time as a starting point. In a synchronization mode, the second processor changes the second time to new second time that occurs within a predetermined allowable time from the first time. In a normal operation mode after the synchronization mode, the first processor sends data via the communication line at the regular intervals P1, and the second processor executes the task operating based on the data at the regular intervals P2 from the new second time as a starting point.

An illustrative second motor drive system according to the present disclosure includes a first motor unit having a first motor and a first processor to control the first motor, and a second motor unit having a second motor and a second processor to control the second motor. The first motor unit and the second motor unit are connected together by a communication line. In a synchronization mode, the first processor sends data via the communication line at first time. In the synchronization mode, the second processor sends, via the communication line, information indicating second time at which the second processor receives the data and third time at which the second processor starts executing a task operating based on the data. In the synchronization mode, the first processor changes the first time to new first time obtained by delaying the first time by a period of time corresponding to a difference between the second time and the third time, based on previously stored information about an operating frequency of the second processor, and information indicating the second time and the third time. In a normal operation mode after the synchronization mode, the first processor sends data via the communication line at regular intervals P1 from the new first time as a starting point, and the second processor receives the data at the regular intervals P2 via the communication line and executes the task.

An illustrative first motor control system according to the present disclosure includes any of the above motor drive systems, and a system controller having a third processor. The first processor of the motor drive system and the third processor are connected together by a control communication line. Prior to the synchronization mode of the first processor and the second processor, a synchronization mode and a normal operation mode of the third processor and the first processor are started. The third processor sends data via the control communication line at regular intervals P3. The first processor receives the data via the control communication line at the regular intervals P3 from first time. The first processor executes a task operating based on the data at the regular intervals P1 from second time as a starting point. In the system synchronization mode, the first processor changes the second time to new second time that occurs within a predetermined allowable time from the first time. In a normal operation mode after the system synchronization mode, the third processor sends data via the control communication line at the regular intervals P3, and the first processor executes the task operating based on the data at the regular intervals P1 from the new second time as a starting point.

An illustrative self-propelled robot according to the present disclosure includes the above first motor control system, a plurality of wheels including a first wheel driven by the first motor and a second wheel driven by the second motor, and a transfer table to place an object on.

An illustrative second motor control system according to the present disclosure includes a system controller having a first processor, and a motor unit having a motor and a second processor to control the motor. The system controller and the motor unit are connected together by a communication line. The first processor sends data via the communication line at regular intervals P1. The second processor receives the data via the communication line at the regular intervals P1 from first time. The second processor executes a task operating based on the data at regular intervals P2 from second time as a starting point. In a synchronization mode, the second processor changes the second time to new second time that occurs within a predetermined allowable time from the first time. In a normal operation mode after the synchronization mode, the first processor sends data via the communication line at the regular intervals P1, and the second processor executes the task operating based on the data at the regular intervals P2 from the new second time as a starting point.

According to the illustrative embodiments of the present disclosure, a real-time distributed system can be constructed in which periodic tasks executed on different processors can be synchronized, and the control cycle can be minimized.

BRIEF DESCRIPTION OF THE DRAWINGS

FIG. 7 is a diagram showing an internal configuration of a hardware (H/W) timer 23a.

DETAILED DESCRIPTION

Firstly, a real-time distributed system that does not have a synchronization mechanism will be described with reference to FIGS. 1-3. Embodiments of a motor drive system according to the present disclosure will then be described. As used herein, the phrase "task of a processor" refers to a task that is executed by the processor. As used herein, the phrases "data that a task outputs" and "data output by a task" refer to data that is generated by execution of the task by a processor and is then sent. Although a "task" is a kind of program that is executed by a processor, a task is expressed by or personified as an entity that generates and sends data.

Figure 1:
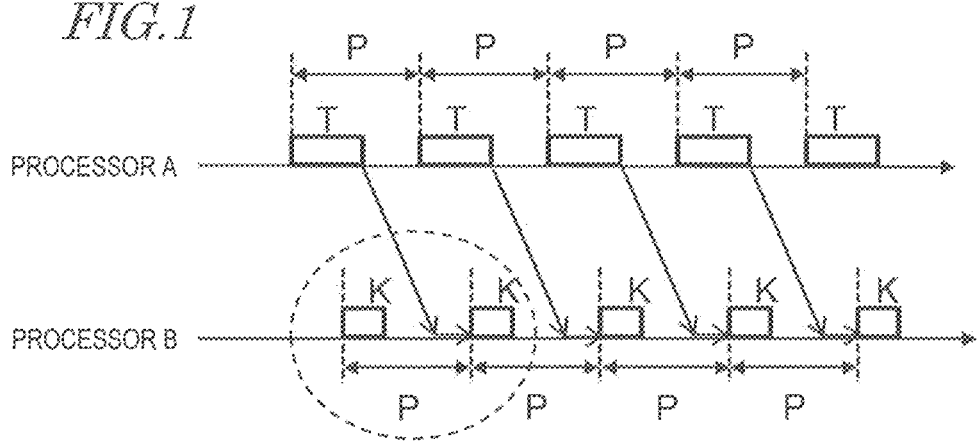
FIG. 1 is a diagram showing example timings of data exchange between processors and processes of the processors in a real-time distributed system that does not have a synchronization mechanism.

FIG. 1 shows example timings of data exchange between processors and processes of the processors in a real-time distributed system that does not have a synchronization mechanism. FIG. 1 shows timings at which data output from tasks T of a processor A is received by a processor B, and is then used in execution of tasks K of the processor B. In FIG. 1, the tasks T and K are periodic tasks that are executed at the same periodic intervals P. Data output from a task T of the processor A is received by the processor B after a predetermined communication delay, and is then retained until the next execution timing of a task K. The data is used in execution of the task K.

Now refer to a portion surrounded by a dashed-line circle of FIG. 1. An enlarged view of that portion is shown in FIG. 2.

Figure 2:
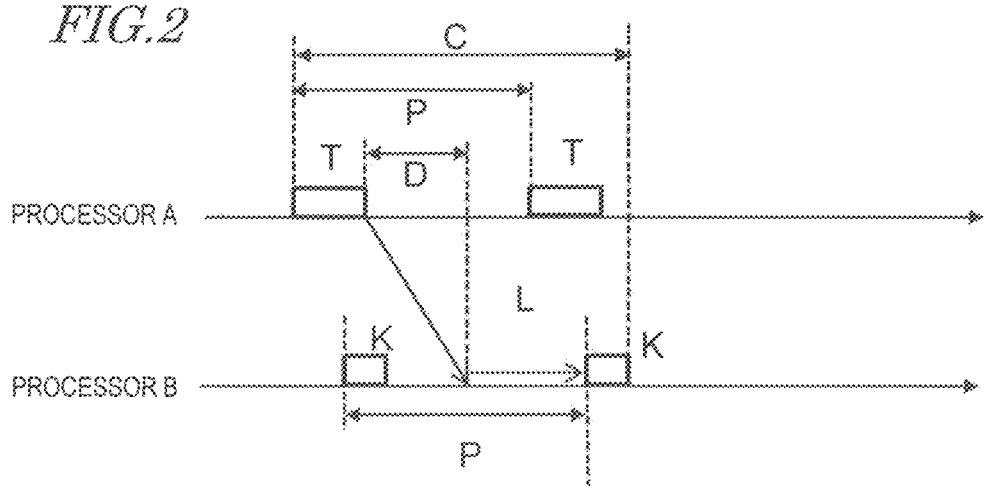
FIG. 2 is a diagram showing a data transmission delay D, and a data retention time L in a processor B.

FIG. 2 shows a data transmission delay D, and a data retention time L in the processor B. As shown in FIG. 2, as the data retention time L increases, a system control cycle formed by a task T and a task K proportionately increases. As used herein, the term "control cycle" refers to a period of time from the start of execution of a task T of the processor A to the end of execution of a task K of the processor B in which data output by the task T is used. FIG. 2 also shows a control cycle C. The execution time of a task T is hereinafter represented by $E_T$, and the execution time of a task K is represented by $E_K$.

Figure 3:
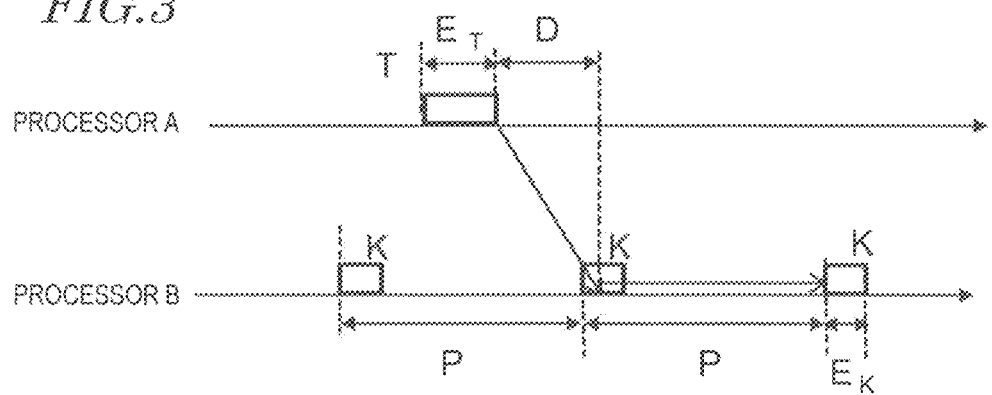
FIG. 3 is a diagram showing an example in which a control cycle is longest.

FIG. 3 shows an example in which the control cycle is longest. In the case where the processor B receives data from the processor A immediately after executing a task K, the control cycle C is longest. In this case, the above retention time L is only slightly shorter than the execution period P of tasks K, i.e., these are substantially equal to each other. Therefore, the longest control cycle is represented by "$E_T+D+P+E_K$." If the control cycle is long, the system is likely to fail. For example, if the output result of a task K of the processor B is waited, and there is another processor or task, it takes a time longer than expected to exchange data, so that the process is not executed on time.

Figure 4:
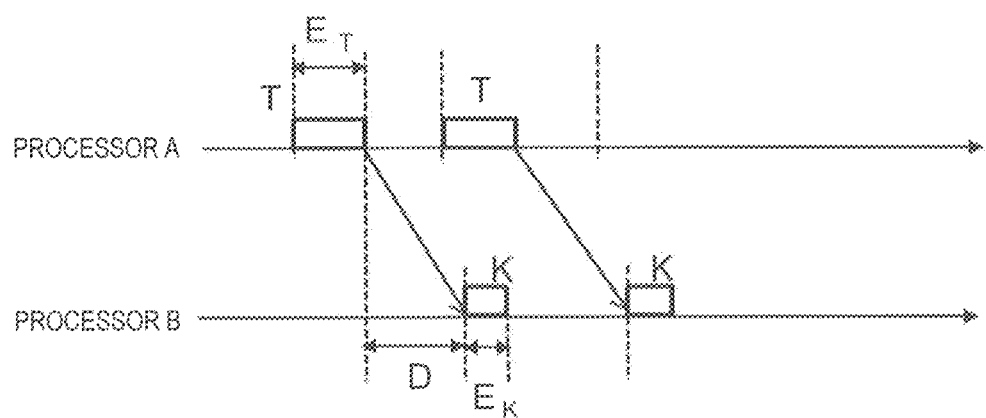
FIG. 4 is a diagram showing an example in which a control cycle is shortest.

Meanwhile, when processors are successfully synchronized, and tasks are executed in a well-organized sequence, the control cycle is shortest. FIG. 4 shows an example in which the control cycle is shortest. When the processor B receives data from the processor A immediately before executing a task K, the control cycle is shortest. In this case, the above retention time L is substantially zero. The shortest control cycle is represented by "$E_T+D+E_K$." The shortest control cycle is shorter than the longest control cycle of FIG. 3 by a period of time corresponding to the periodic interval P of tasks K.

The present disclosure relates to a technique of adjusting the execution timings of tasks T and/or tasks K such that each periodic task T of the processor A sends data, and the processor B starts executing a periodic task K immediately after receiving the data.

The concept of a process of the system of the present disclosure will now be described with reference to FIGS. 5-12. A motor drive system employing the real-time distributed system, and variations and application examples thereof, will then be described.

As used herein, the terms "synchronize," "synchronizing," "synchronized," "synchronization," etc., with respect to tasks of the processor A and tasks of the processor B refer to that each periodic task T of the processor A outputs data, and the processor B starts executing a periodic task K immediately after receiving the data. Note that in the present disclosure, the communication delay D between data transmission and data reception may be included. The term "immediately after" may be defined in advance. For example, a period of time indicated by the term "immediately after" may be defined as 10 clocks or less of an operation clock of the processor B.

Figure 5:
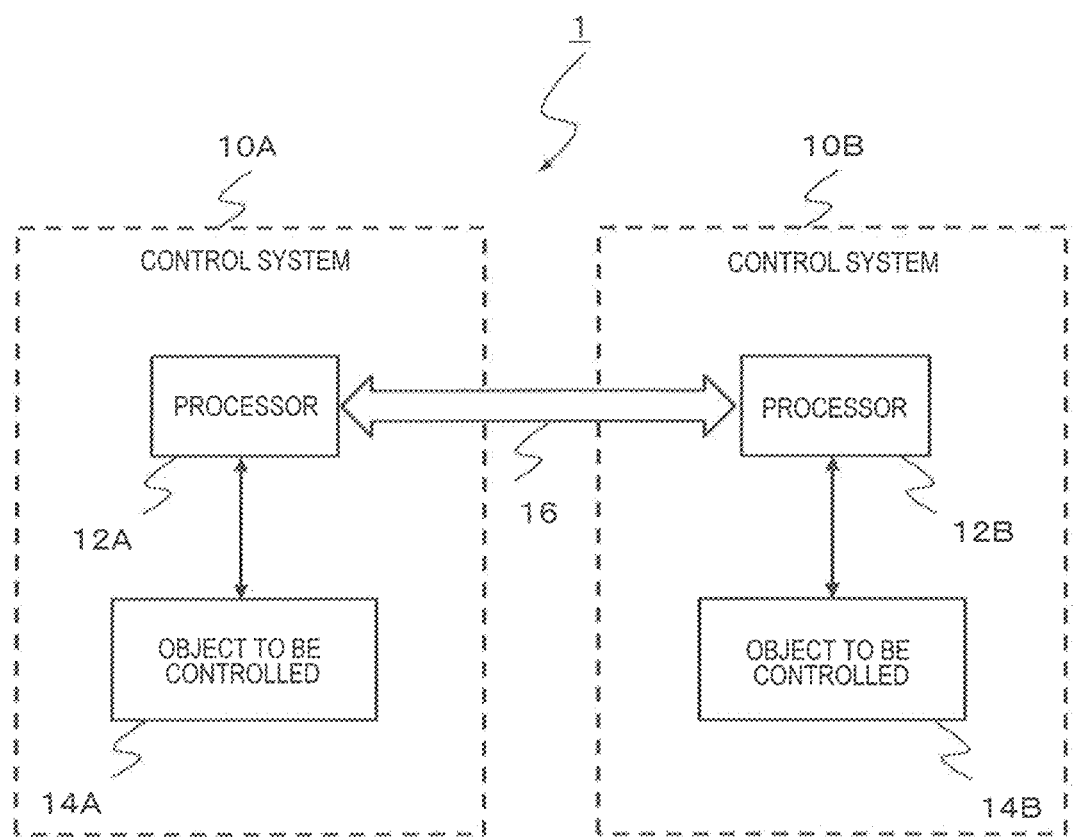
FIG. 5 is a diagram showing a configuration of a real-time distributed system 1 according to the present disclosure.

FIG. 5 shows a configuration of a real-time distributed system 1 according to the present disclosure. The real-time distributed system 1 is hereinafter simply referred to as the "system 1." The system 1 includes two control systems 10A and 10B that are connected together by an asynchronous communication line 16. The control system 10A has a processor 12A and an object 14A to be controlled. The control system 10B has a processor 12B and an object 14B to be controlled. The control system 10A and the control system 10B can exchange data with each other via the asynchronous communication line 16.

As used herein, the term "asynchronous" means that a special signal that indicates a timing, such as a clock signal, is not employed. The asynchronous communication scheme typically refers to a communication scheme in which a start bit that can be uniquely identified is added to the head of a signal, and a stop bit that can be uniquely identified is added to the tail of the signal, and therefore, a signal to be transmitted is delimited, whereby a sender and a receiver do not need to coordinate their timings together.

Note that the technique according to the present disclosure can be carried out no matter whether a line used therein is for asynchronous communication or synchronous communication. This is because the operation of a system that performs an operation described below can be carried out using either of the two communication lines.

The communication line 16 is either wired or wireless.

As described below, an example of the system 1 is a motor drive system included in a self-propelled robot that has two driven wheels that are driven by a motor, and two or more trailing wheels (non-driven wheels). The control systems 10A and 10B control the left wheel and the right wheel, respectively. The processors 12A and 12B each send a control signal (PWM signal) to a motor drive circuit that is an example of the objects 14A and 14B to be controlled, to control the rotation of a motor (not shown).

In order to cause the self-propelled robot to travel straight at a desired speed, and turn right or left at a desired speed and turning radius, it is necessary to adjust the rotational speeds of both of the driven wheels. To adjust the rotational speed, the processor 12A of the control system 10A executes a task to determine the rotational speed of a motor that is the object 14A to be controlled, and sends data of the rotational speed of the right wheel determined from information about the rotational speed of the left wheel, to the processor 12B of the control system 10B, for example. The processor 12B determines the rotational speed of a motor for the right wheel using the data, to control the rotation.

If a task of the processor A and a task of the processor B fail to be synchronized, so that an unallowable amount of delay occurs, the left wheel and the right wheel are activated at different timings, so that the rotational speed deviates from a desired value, and therefore, it is difficult for the self-propelled robot to move at an intended speed and in an intended direction. Therefore, it is necessary to synchronize tasks of the processor A with tasks of the processor B. To achieve such synchronization, the process of the present disclosure is used.

Next, an internal structure of the processors 12A and 12B will be described.

Figure 6:
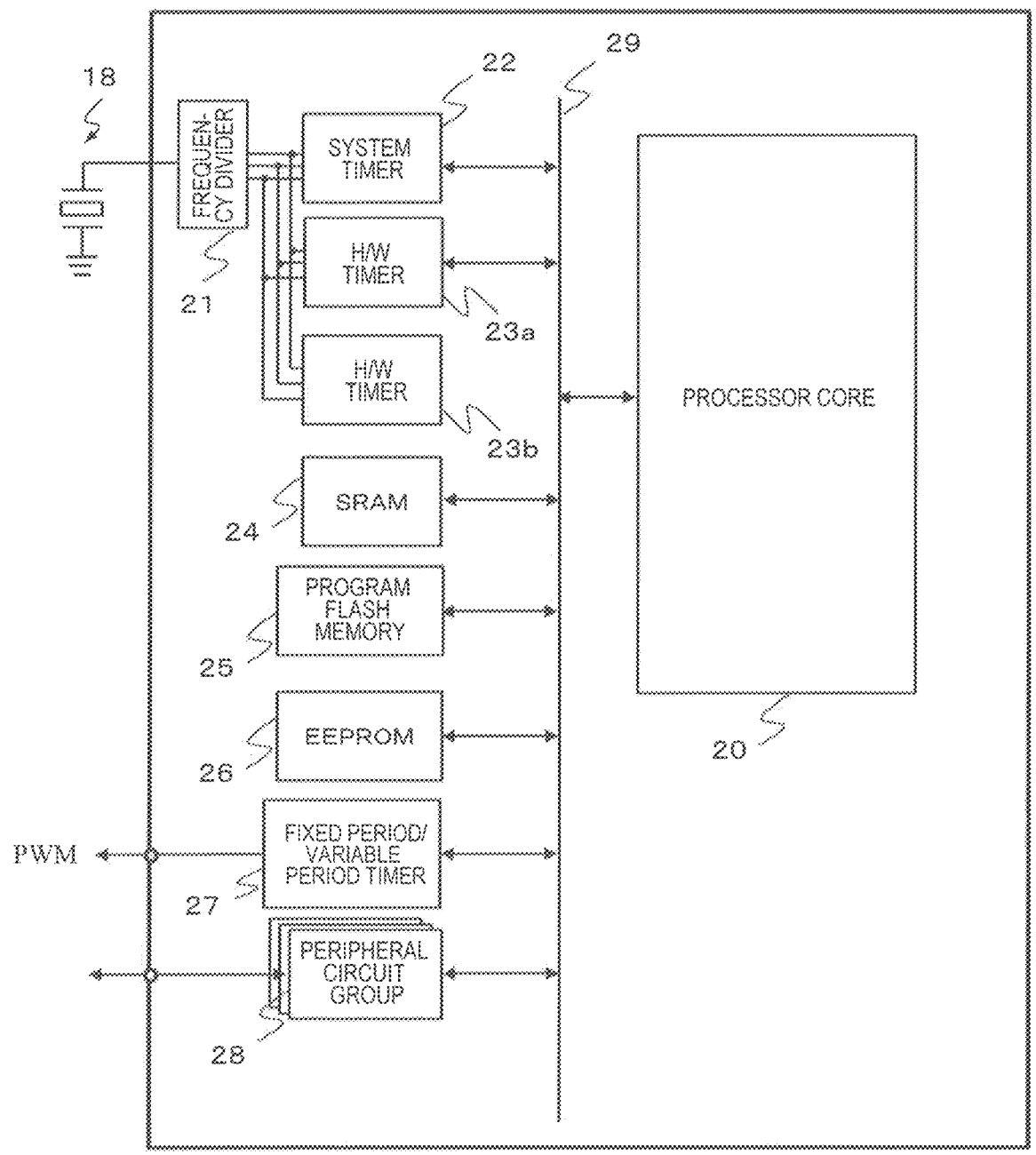
FIG. 6 is a diagram showing an internal structure of processors 12A and 12B.

FIG. 6 shows an internal structure of the processors 12A and 12B. The processors 12A and 12B are hereinafter collectively referred to as "the processors 12." Note that the processors 12A and 12B do not need to have the same structure. The processors 12A and 12B are referred to as "the processors 12" only for the sake of convenience.

The processor 12 has a processor core 20, a frequency divider 21, a system timer 22, hardware (H/W) timers 23a and 23b, an SRAM 24, a program flash memory 25, an EEPROM 26, a fixed period/variable period timer group 27, a peripheral circuit group 28, and an internal data bus 29.

The processor core 20 is a computation circuit that includes various sub-components. The processor core 20 includes, for example, a program counter, a command register, a command decoder, a stack pointer, a general-purpose register, and a timer interrupt control circuit. These are all commonly used and will not be described in detail.

The frequency divider 21 receives an external clock signal from a crystal or silicon oscillator 18 that is provided outside the processor 12, divides the frequency of the external clock signal, and outputs a clock signal having a predetermined frequency.

The system timer 22 generates an internal clock signal having a predetermined frequency for operating the processor 12, based on the clock signal received from the frequency divider 21.

The H/W timers 23a and 23b each increment a timer counter (described below) using the clock signal received from the frequency divider 21, and when the counter value reaches a predetermined value, outputs an interrupt signal to the processor core 20. Note that the number of H/W timers is not particularly limited. Three or more H/W timers may be provided. The timer counter may also be a decrement counter.

The SRAM 24 is a work memory for use in operation of the processor core 20, and stores data that is frequently rewritten.

The program flash memory 25 is a memory that stores a program and data that is less frequently rewritten.

The EEPROM 26 is a kind of non-volatile memory that can retain stored data even when power is shut off, and allows data to be electrically rewritten. Various preset values described below are stored in the EEPROM 26.

The fixed period/variable period timer group 27 is a circuit including a combination of a plurality of timers for generating a PWM signal. By combining a fixed period timer and a variable period timer, a pulse-width modulated signal can be generated. Although, in this embodiment, the H/W timer and the fixed periodic interval/variable period timer are separate timers, this configuration is merely illustrative. The H/W timer and the fixed period/variable period timer do not need to be separate timers. For example, the fixed period/variable period timer may be provided as an H/W timer.

The peripheral circuit group 28 is a group of circuits other than the above circuits. The peripheral circuit group 28 includes, for example, a high-precision analog circuit (an A/D converter, a D/A converter), a motor control circuit, a universal asynchronous receiver-transmitter (UART), which performs conversion between a serial signal and a parallel signal, and a communication interface device.

Next, a configuration of the H/W timer will be described. The H/W timers 23a and 23b may have the same configuration. The H/W timer 23a will now be described as a representative example.

Figure 7:
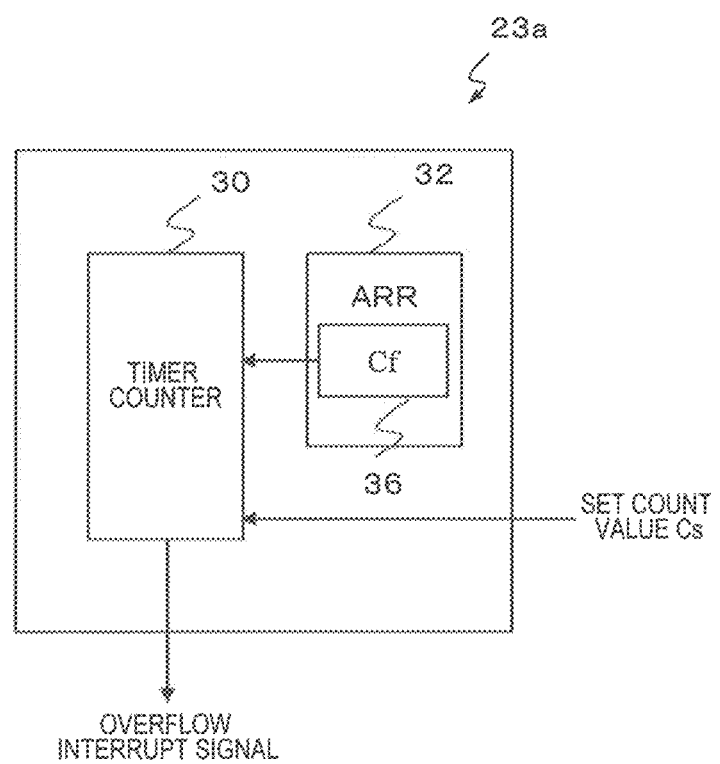

FIG. 7 shows an internal configuration of the H/W timer 23a.

The H/W timer 23a has a timer counter 30 and an auto-reload register (ARR) 32. The ARR 32 stores data 36 indicating an upper-limit count value Cf. The timer counter increments the counter value, starting with an initial count value C0, based on a clock signal supplied from the frequency divider 21. When the counter value reaches the upper-limit count value Cf stored in the ARR 32, the timer counter 30 stops counting, and outputs, to the processor core 20, an overflow interrupt signal indicating the occurrence of overflow in the timer counter 30. Thereafter, the timer counter 30 resets the count value to the initial count value C0.

The oscillator 18 and the frequency divider 21 output a sufficiently accurate clock signal. The H/W timer 23a, which receives the clock signal to increment the counter, also increments the counter sufficiently accurately, and causes the counter to overflow at periodic intervals P.

Figure 8:
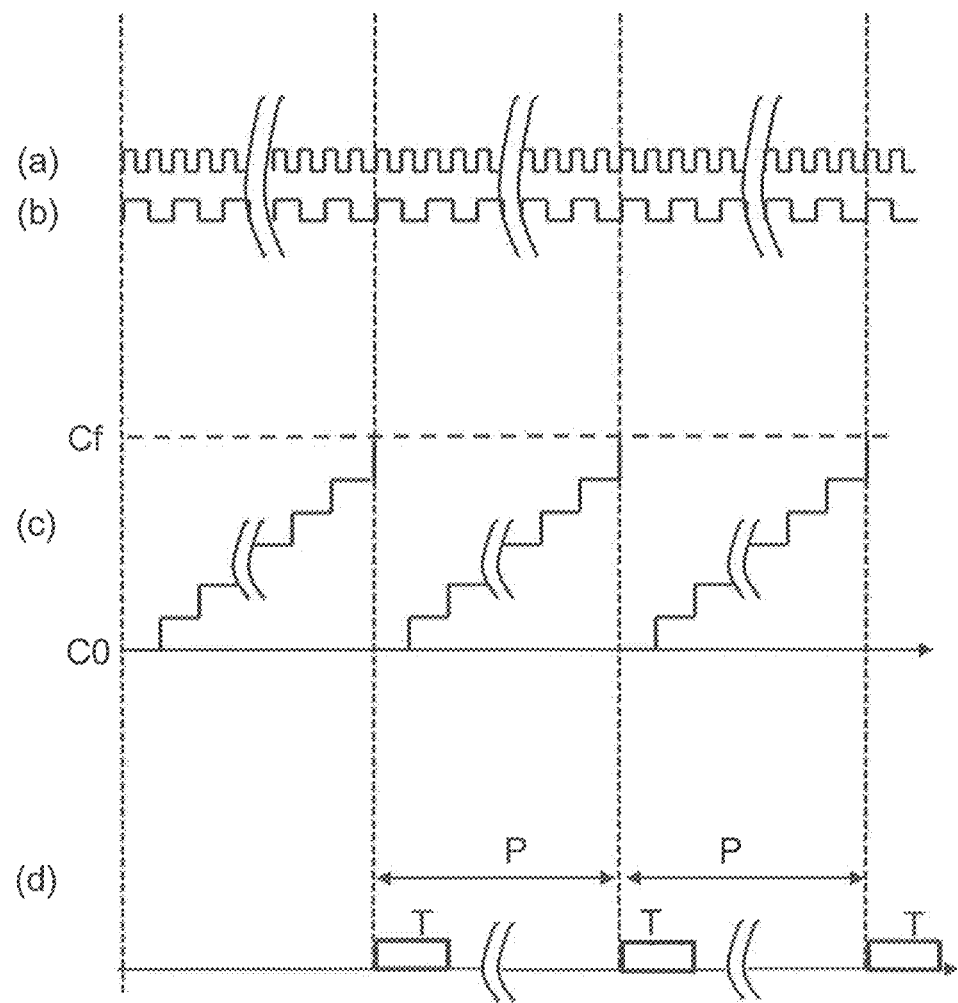
FIG. 8 is a timing diagram of a clock signal, count values of the H/W timer 23a, and tasks T executed by a processor core 20.

FIG. 8 is a timing diagram of a clock signal, count values of the H/W timer 23a, and tasks T executed by the processor core 20. FIG. 8(a) shows a waveform of an external clock signal output from the oscillator 18. FIG. 8(b) shows an example waveform of a clock signal output from the frequency divider 21. As an example, it is assumed that the frequency divider 21 is a divide-by-2 frequency divider.

FIG. 8(c) shows counter values of the H/W timer 23a, which is an increment counter starting with the initial value C0. The H/W timer 23a starts counting at a timing of a rise of the clock signal of the frequency divider 21, and increments the counter. When the counter value reaches the upper-limit count value Cf, the H/W timer 23a outputs an overflow interrupt signal to the processor core 20.

FIG. 8(d) shows timings of execution of tasks T by the processor core 20 in response to reception of overflow interrupt signals. In response to reception of an overflow interrupt signal, the processor core 20 suspends a program being executed at that time, and activates a program called an interrupt handler. The interrupt handler is previously programmed so as to execute a task T, which is a program.

The time it takes for the H/W timer 23a to count from the initial value C0 to the upper-limit count value Cf is "P." In other words, the processor core 20 can activate a task T at predetermined periodic intervals of P, the activation being triggered by an overflow interrupt signal from the H/W timer 23a.

Referring back to FIG. 7, the timer counter 30 normally counts from the initial count value C0 to the upper-limit count value Cf. However, when the timer counter 30 receives a signal specifying a set count value Cs from the processor core 20, the timer counter 30 starts counting from the set count value Cs. By setting the set count value Cs as appropriate, the time it takes for the timer counter 30 to overflow can be adjusted.

Note that in this embodiment, when the timer counter 30 reaches the upper-limit count value Cf after starting counting upward from the specified set count value Cs, the timer counter 30 resets the count value to the initial count value C0. Therefore, the timer counter 30 changes the initial count value only when the set count value Cs is specified.

Next, a process for adjusting the asynchronous state of FIG. 1, in which tasks T of the processor 12A and tasks K of the processor 12B are not synchronized, into the synchronous state of FIG. 4, will be described. As described above, if a long control cycle occurs due to an asynchronous state of a task T and a task K, the system 1 is likely to fail. It is necessary to achieve synchronization between tasks T and tasks K as quickly as possible.

Figure 9:
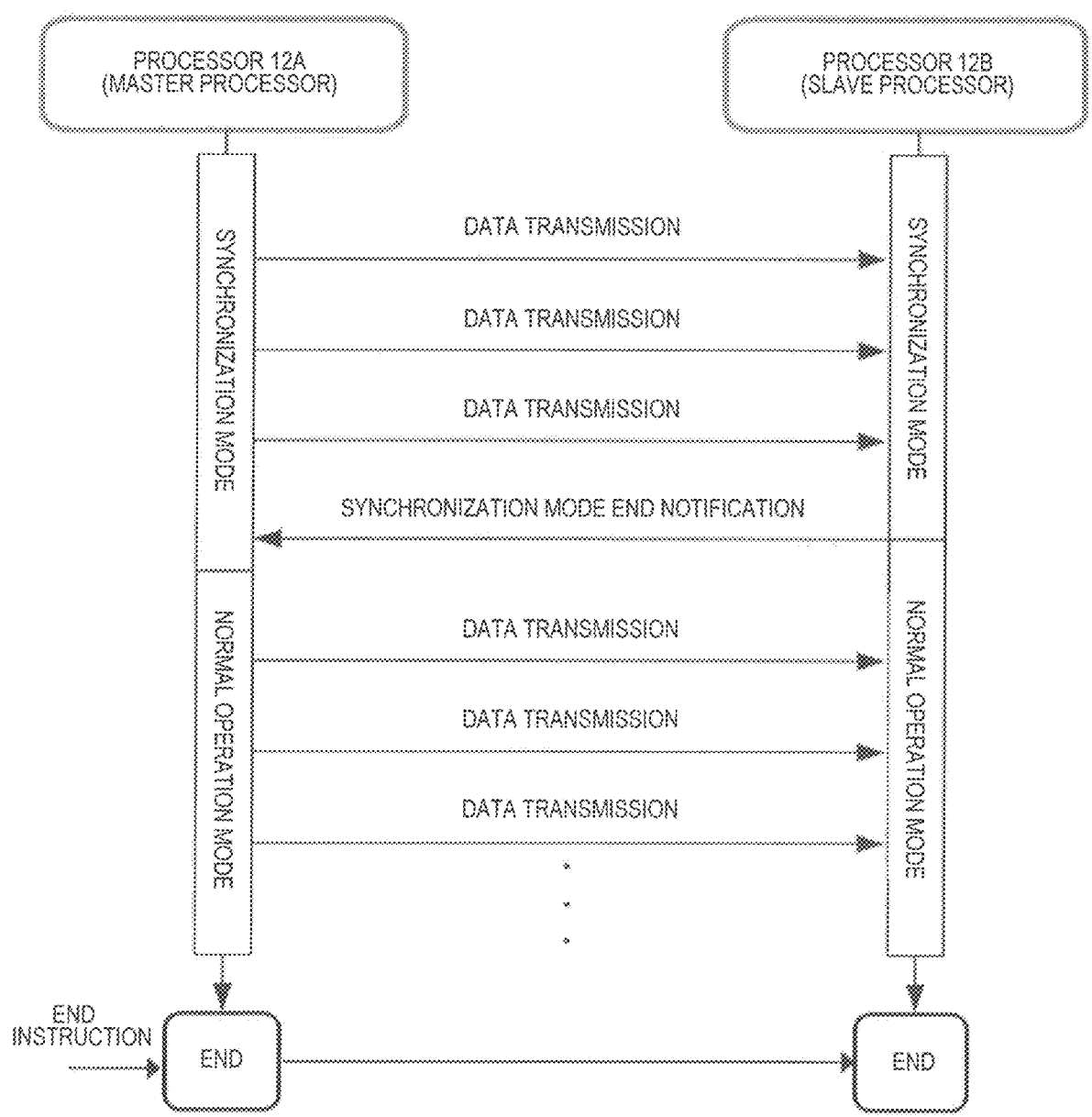
FIG. 9 is a diagram showing a flow of an operation for synchronizing task execution of the processor 12A and task execution of the processor 12B.

FIG. 9 shows a flow of an operation for synchronizing the task execution of the processor 12A and the task execution of the processor 12B. In this embodiment, the processor 12B changes its own operation timing so that the operating period of tasks K executed by the processor 12B is suited to the operating period of tasks T executed by the processor 12A, for example. Taking such a master-slave relationship into account, the processor 12A may hereinafter be referred to as a "master processor," and the processor 12B may hereinafter be referred to as a "slave processor."

The processors 12A and 12B initially operate in a "synchronization mode." In the synchronization mode, the processors 12A and 12B cause tasks T of the processor 12A and tasks K of the processor 12B, which are not synchronous, to transition to the synchronous state of FIG. 4.

After the end of the synchronization mode, the processors 12A and 12B transition to a normal operation mode. In the normal operation mode, the processors 12A and 12B perform a predetermined normal operation. Note that tasks T and tasks K have been synchronized due to the synchronization mode, and therefore, as described above with reference to FIG. 4, the operating period of tasks T and K is shortest, i.e., "$E_T+D+E_K$."

The synchronization mode is automatically executed at the start of the operation of the system 1, for example. The operation starts at the time that power is turned on, for example.

In the synchronization mode, the operation of the processor 12A, which is a master processor, is almost the same as that in the normal operation mode. The processor 12A executes tasks T at the periodic intervals P, as with the "processor A" of FIG. 1, for example, so that the processor 12A sends data to the processor 12B at the periodic intervals P.

In the synchronization mode, the processor 12B receives data from the processor 12A at the periodic intervals P. The processor 12B adjusts time at which a task K is executed such that a difference between time at which data is received and time at which the task K is executed by itself is sufficiently reduced. The term "substantially reduced" with respect to the difference refers to that the difference is within a predetermined allowable time. The adjustment of time at which a task K is executed is achieved by adjusting the timer counter 30 of the H/W timer 23a.

When determining that tasks T of the processor 12A and tasks K of the processor 12B have been synchronized by the adjustment of the operation timings of tasks K, the processor 12B sends a notification indicating the end of the synchronization mode to the processor 12A. The transmission and reception of the notification trigger transition of the operations of the processors 12A and 12B from the synchronization mode to the normal operation mode.

Note that even after the end of the synchronization mode, the H/W timers 23a in the processors 12A and 12B continue to increment and reset the count value at the periodic intervals that remain unchanged. Therefore, the processors 12A and 12B can execute tasks T and K while maintaining the operation timings adjusted in the synchronization mode.

Next, a process of each of the processors 12A and 12B will be described with reference to FIGS. 10 and 11.

Figure 10:
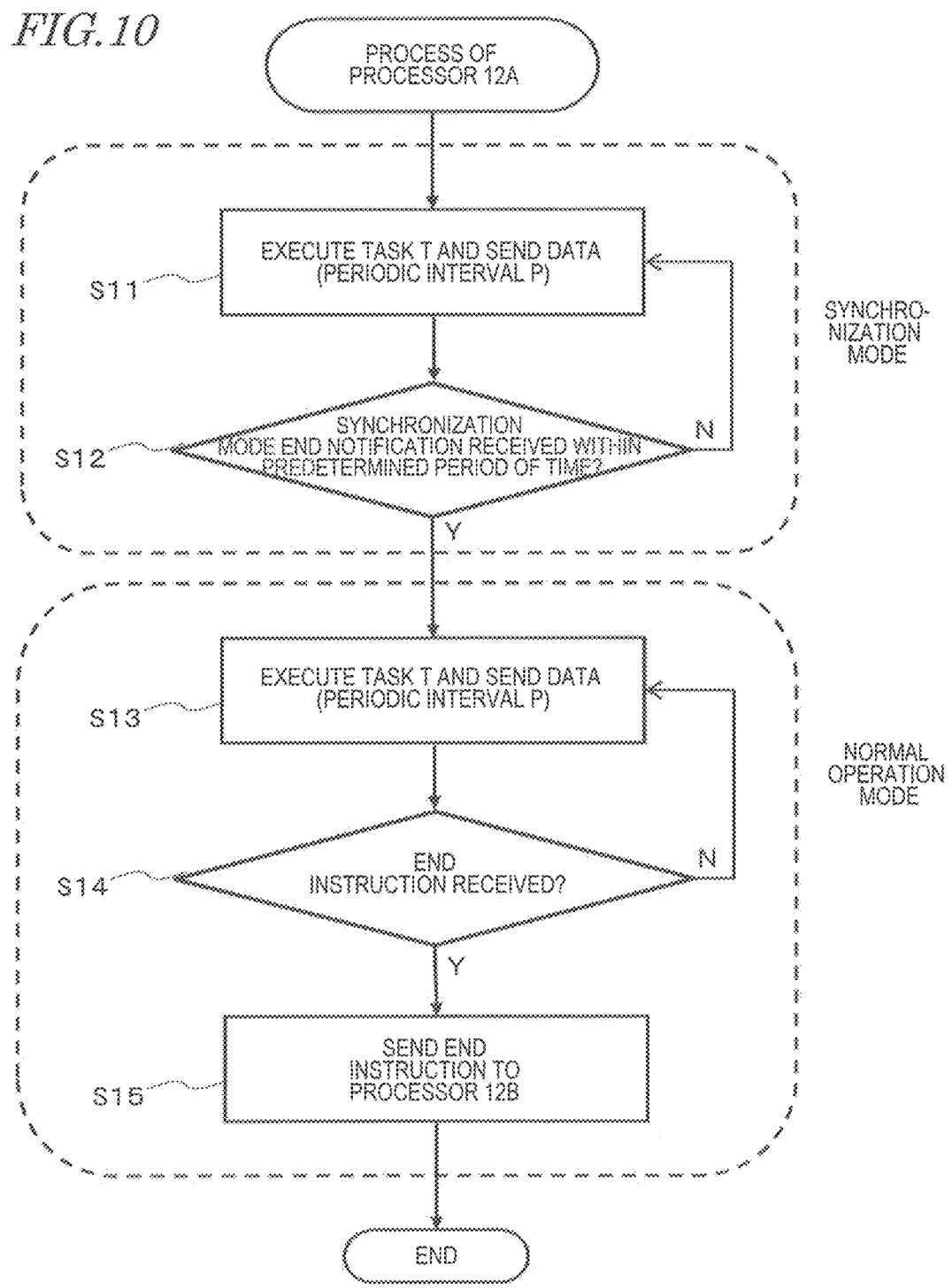
FIG. 10 is a flowchart showing steps involved in a process of the processor 12A.

FIG. 10 shows steps involved in the process of the processor 12A. Steps S11 and S12 are processes in the synchronization mode, and steps S13-S15 are processes in the normal operation mode. Note that the process of the processor 12A is substantially implemented by the processor core 20.

In step S11 of the synchronization mode, the processor 12A executes a task T, and sends data obtained as a result of the execution to the processor 12B. The execution of a task T and the transmission of data are each performed at periodic intervals P. The periodic interval P corresponds to the time it takes for the timer counter 30 (FIG. 7) to count upward from the initial count value C0 to the upper-limit count value Cf.

In step S12, the processor 12A determines whether or not the processor 12A has received a synchronization mode end notification from the processor 12B within a predetermined time since the execution of step S11. The "predetermined time" may be the execution period of a task T or a period of time exceeding the execution period. The reason why the latter case is allowable is that when the processor 12A receives the synchronization mode end notification from the processor 12B, a communication delay occurs, and therefore, the notification cannot always be received within the execution period.

If the determination result of step S12 is positive, control proceeds to step S13. Otherwise, control returns to step S11. The reception of the synchronization mode end notification means that tasks T of the processor 12A and tasks K of the processor 12B have been synchronized. In the processor 12A, the timer counter 30 continues to perform increment counting at periodic intervals that remain unchanged.

In step S13 of the normal operation mode, the processor 12A executes a task T, and sends data as a result of the execution to the processor 12B. The process of step S13 is substantially the same as the process of step S11.

In step S14, the processor 12A determines whether or not the processor 12A has received an instruction to end a task T. The end instruction is sent from a user or a higher-level device (not shown). When the processor 12A has received the end instruction, control proceeds to step S15. When the processor 12A has not received the end instruction, control returns to step S13, in which the execution of a task T and the transmission of data are performed at the periodic intervals P.

In step S15, the processor 12A sends the end instruction to the processor 12B, and ends the process. As a result, the control system 10A including the processor 12A stops operating.

Figure 11:
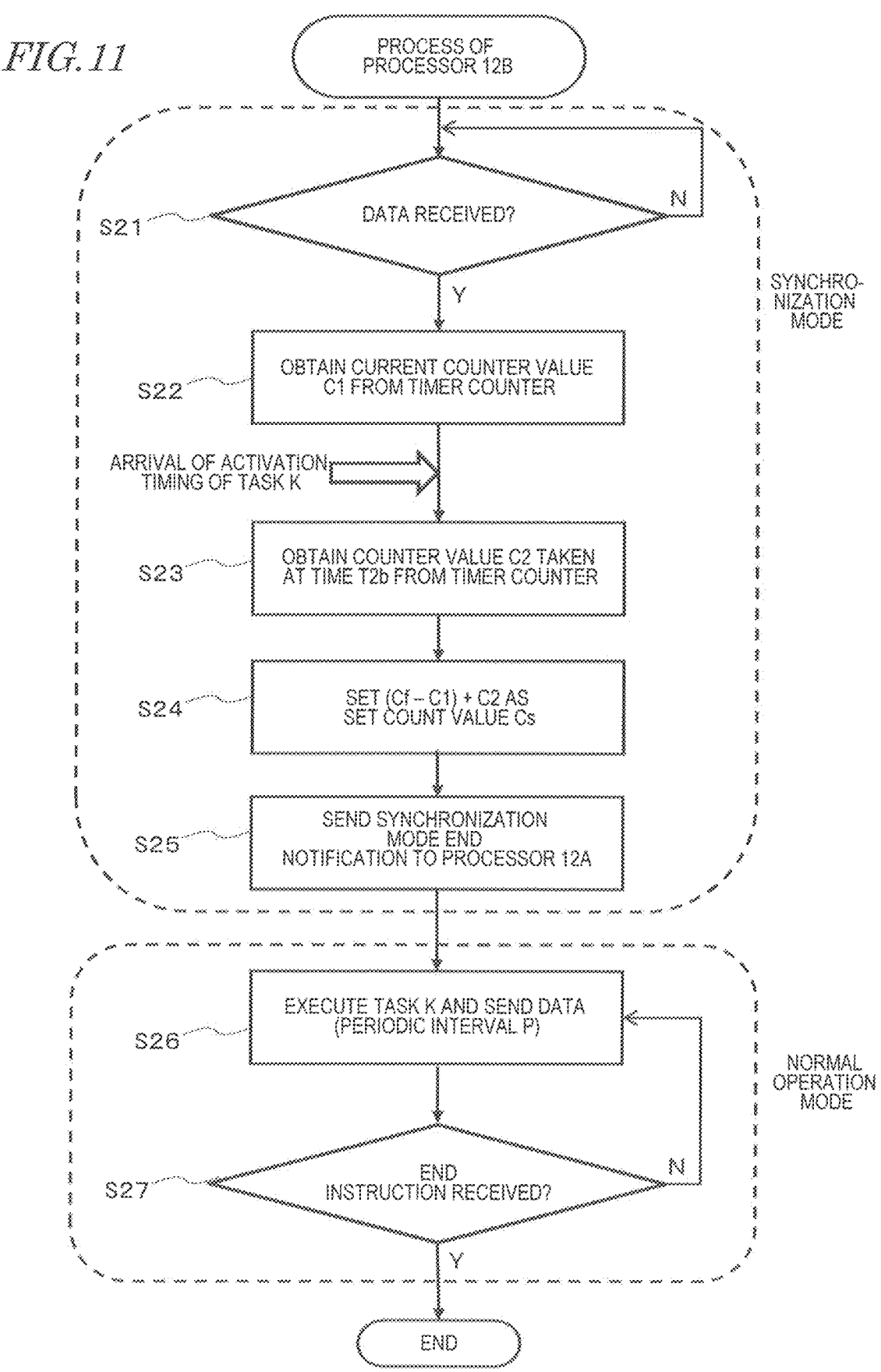
FIG. 11 is a flowchart showing steps involved in a process of the processor 12B.

FIG. 11 shows steps involved in the process of the processor 12B. Steps S21-S25 described below are processes in the synchronization mode, and steps S26 and S27 described below are processes in the normal operation mode. Concerning the process of the processor 12B, the operation of the processor core 20 and the operation of the H/W timer 23a are described separately.

In step S21 of the synchronization mode, the processor core 20 determines whether or not the processor core 20 has received data from the processor 12A. When the processor core 20 has not received data, the processor core continues to wait for reception of data. When the processor core 20 has received data, control proceeds to step S22. Note that the presence or absence of reception of data can be determined based on the presence or absence of an interrupt signal from a communication interface device shown as the peripheral circuit group 28 (FIG. 6). The interface device, when receiving data, sends an interrupt signal to the processor core 20.

In step S22, the processor core 20 obtains the current counter value C1 of the timer counter 30 from the H/W timer 23a. The counter value C1 indicates time at which data is received.

Thereafter, the timer counter 30 continues to increment. When the timer counter 30 reaches the upper-limit count value Cf, the timer counter 30 sends an overflow interrupt signal to the processor core 20. In response to reception of the signal, the processor core 20 activates an interrupt handler. The process of the interrupt handler allows the processor core 20 to execute a task K.

In step S23, the processor core 20 obtains the current counter value C2 of the timer counter 30 from the H/W timer 23a. The counter value C2 indicates time at which a task K is executed.

In step S24, the processor core 20 calculates a difference between the two obtained counter values C1 and C2, adds the difference value to the initial count value C0, and sends the resultant value to the H/W timer 23a. The H/W timer 23a sets the value obtained from the processor core 20 as the set count value Cs. As a result, the timer counter 30 of the H/W timer 23a starts incrementing with the set count value Cs, at a timing that the timer counter 30 is next reset.

The process of step S24 advances the timer counter 30 by the time difference L between time at which data is received from the processor 12A and time at which a task K is executed in the processor 12B. As a result, the timer counter 3 reaches the upper-limit count value Cf a period of time corresponding to the time difference L earlier. In other words, time at which a task K is activated is earlier by a period of time corresponding to the time difference L. In addition, the time at which a task K is activated is the same as time at which data is received from the processor 12A. Immediately after the processor core 20 receives data, a task K can execute a process using the data. Thus, the task T of the processor 12A and the task K of the processor 12B can be synchronized. It is not necessary to use a communication line for performing synchronous communication based on a synchronization signal.

In step S25, the processor core 20 of the processor 12B sends a synchronization mode end notification to the processor 12A. As a result, the synchronization mode of the processor 12B ends.

In step S26 of the normal operation mode, the processor core 20 of the processor 12B executes a task K each time the count value of the timer counter 30 takes the upper-limit count value Cf. In the synchronization mode, time at which data is received and time at which a task K is activated are the same time, and therefore, the processor 12B does not need to continue to retain the received data, unlike the example of FIG. 2.

In step S27, the processor 12B determines whether or not the processor core 20 has received an instruction to end execution of tasks K. The end instruction is sent from the processor 12A. When the end instruction has been received, control ends. As a result, the control system 10B including the processor 12B stops operating.

When the end instruction has not been received, control returns to step S26. The processor 12B executes a task K and receives data at the periodic intervals P.

The processes of steps S22-S24 of the processor 12B will now be specifically described with reference to FIG. 12.

Figure 12:
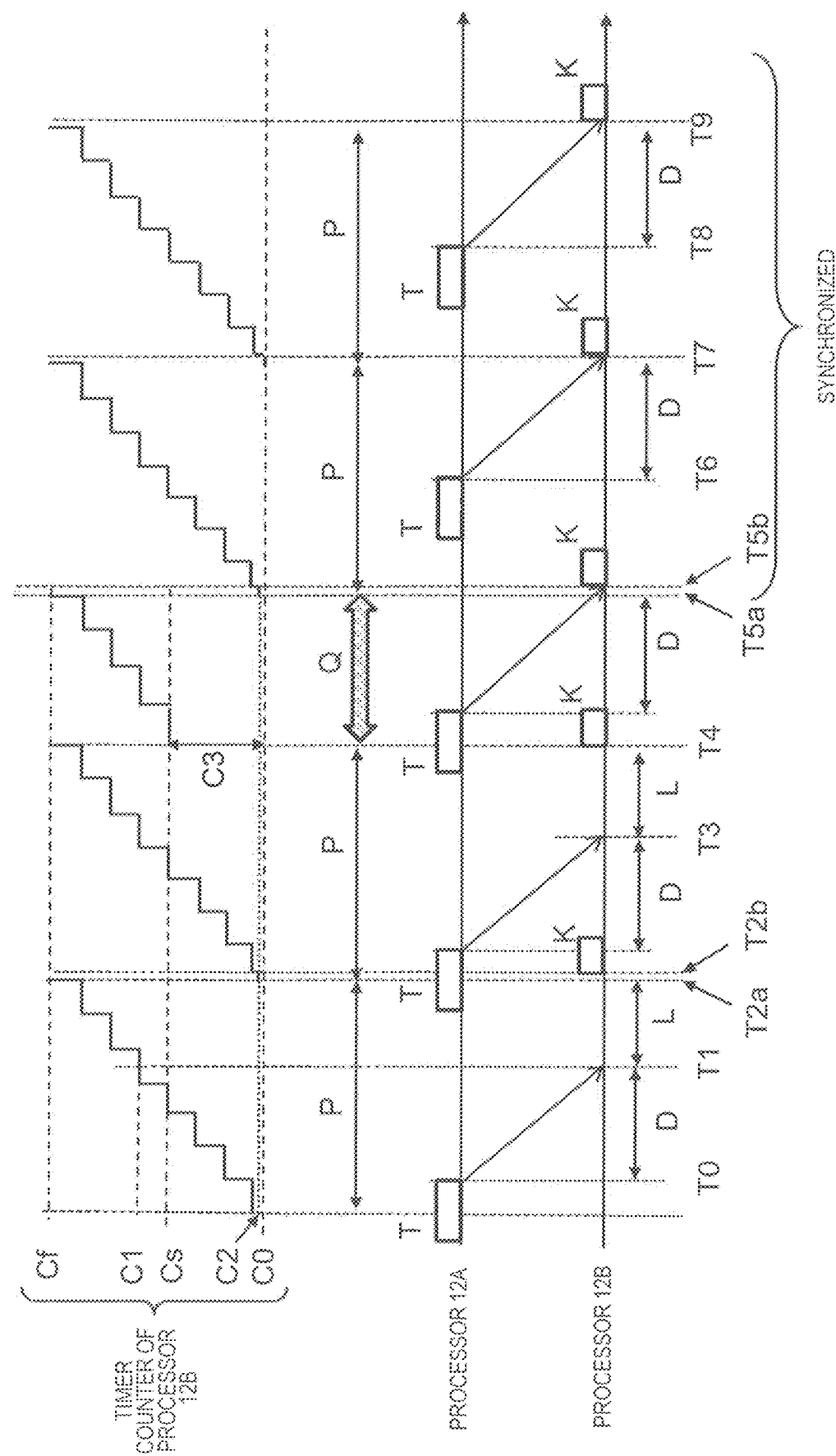
FIG. 12 is a timing diagram showing counter values of a timer counter 30 of the processor 12B, and execution timings of tasks T of the processor 12A and tasks K of the processor 12B.

FIG. 12 is a timing diagram showing the counter values of the timer counter 30 of the processor 12B, and the execution timings of tasks T of the processor 12A and tasks K of the processor 12B. Note that the number of counts is reduced for ease of understanding.

At time T0, a task T of the processor 12A sends data. At time T1, the processor 12B receives data. FIG. 12 shows a counter value C1 at time T1. The processor core 20 of the processor 12B obtains the current counter value C1 of the timer counter 30 that is taken at time T1 (step S22 of FIG. 11).

Next, time T2 at which the counter value of the processor 12B takes the upper-limit count value Cf will be described. At time T2, the processor core 20 of the processor 12B executes a task K in response to an overflow interrupt signal from the H/W timer 23a. The processor core 20 obtains a counter value C2 that is taken at time T2 (step S23 of FIG. 11).

Note that the counter value C2 may be the same as the upper-limit count value Cf. The processor core 20 may not obtain the counter value of the timer counter 30, and may use C2 as a predetermined value.

Next, the processor core 20 of the processor 12B performs computation to obtain the set count value Cs during a period of time between time T2 and time T4. Specifically, the processor core 20 calculates a difference value C3=C2−C1, and also calculates C0+C3. The processor core 20 sets the obtained value as the set count value Cs (step S24 of FIG. 11).

As can be seen from FIG. 12, counting starts with the set count value Cs from time T4. Until time T4, the H/W timer 23a of the processor 12B outputs an overflow interrupt signal at the periodic intervals P. However, a time section Q between time T4 and time T5 is shorter than the time section of the periodic interval P. At time T5, the counter value takes Cf. As a result, at time T5, the processor core 20 of the processor 12B executes a task K.

From time T0 until time T4, there is a delay L between time at which data is received from the processor 12A and time at which the processor 12B executes a task K. However, such a delay does not occur from time T5 to time T9 after the set count value Cs is set at time T4. Thus, tasks T of the processor 12A and tasks K of the processor 12B are synchronized.

The set count value Cs calculated in the foregoing is an example implementation in which the time until a task K is executed after the processor 12B receives data is minimized. However, the present disclosure is not limited to the example implementation. A maximum allowable value α of the delay time between time at which data is received and time at which a task is executed, in the processor 12B, can be obtained by design. Therefore, C3≤(C2−C1)+α may be established. If the value C3 thus calculated is used to calculate the set count value Cs, a task K is executed within a predetermined allowable time from time at which data is received.

The processor core 20 of the processor 12B receives data at the regular periodic intervals P from time T1 as a starting point, and executes a task K at the regular periodic intervals P from time T2 as a starting point. However, it can be said that by setting the set count value Cs using the above procedure, the processor core 20 changes time at which a task K is executed, to time that occurs within a predetermined allowable time from time at which data is received.

At time T0, a task T of the processor 12A sends data. At time T1, the processor 12B receives the data. FIG. shows the counter value C1 taken at time T1. The processor core 20 of the processor 12B obtains the counter value C1 that is taken by the timer counter 30 at the current time T1 (step S22 of FIG. 11).

Next, refer to time T2b at which the processor core 20 of the processor 12B executes a task K after time T2a at which the counter value of the timer counter 30 of the processor 12B is the upper-limit count value Cf.

Note that the reason why there are separate time T2a and time T2b is that time T2a and time T2b may be different times. At time T2a, the H/W timer 23a outputs an overflow interrupt signal. At this time, if the processor core 20 of the processor 12B is executing another task, the processor core 20 of the processor 12B saves data of that task, and then reads a task K. After these processes are completed, execution time T2b of the task K arrives. It takes an actual time to execute the processes for a period of time between time T2a and time T2b. During that period of time, the timer counter 30 is reset and starts counting from the count value C0.

The processor core 20 of the processor 12B executes a task K in response to an overflow interrupt signal from the H/W timer 23a at time T2a. The processor core 20 obtains the counter value C2 taken at time T2b (step S23 of FIG. 11).

Next, the processor core 20 of the processor 12B performs computation to obtain the set count value Cs during a period of time between time T2b and time T4. Specifically, the processor core 20 calculates C3=(Cf−C1)+(C2−C0) to obtain the difference value C3, and also calculates C0+C3. The processor core 20 sets the obtained value as the set count value Cs (step S24 of FIG. 11). That is, the processor core 20 calculates Cs=(Cf−C1)+C2 (step S24 of FIG. 11).

Note that the counter value C2 may be dealt with as being equal to the upper-limit count value Cf. The processor core 20 may not obtain the counter value of the timer counter 30 and may use the predetermined value Cf as C2.

As can be seen from FIG. 12, counting starts with the set count value Cs from time T4. Until time T4, the H/W timer 23a of the processor 12B outputs an overflow interrupt signal at the periodic intervals P. However, a time section Q between time T4 and time T5a is shorter than the time section of the periodic interval P. At time T5a, the counter value is Cf. Thereafter, at time T5b, the processor core 20 of the processor 12B executes a task K. Note that in this example, time (T5b−T5a)=(T2b−T2a).

From time T0 until time T4, there is a delay between time at which data is received from the processor 12A and time at which the processor 12B executes a task K. However, such a delay does not occur from time T5 to time T9 to time T9 after the set count value Cs is set at time T4. Thus, tasks T of the processor 12A and tasks K of the processor 12B are synchronized.

The set count value Cs calculated in the foregoing is an example implementation in which the time until a task K is executed after the processor 12B receives data is minimized. However, the present disclosure is not limited to the example implementation. A maximum allowable value a of the delay time between time at which data is received and time at which a task is executed, in the processor 12B, can be obtained by design. Therefore, $C3 \leq (Cf-C1)+(C2-C0)+\alpha$ may be established. If the value C3 thus calculated is used to calculate the set count value Cs, a task K is executed within a predetermined allowable time from time at which data is received.

The processor core 20 of the processor 12B receives data at the regular intervals (periodic intervals) P from time T1 as a starting point, and executes a task K at the regular periodic intervals P from time T2 as a starting point. However, it can be said that by setting the set count value Cs using the above procedure, the processor core 20 changes time at which a task K is executed, to time that occurs within a predetermined allowable time from time at which data is received.

Next, two variations will be described.

(Variation 1) In the above example, the processor A sends data to the processor B at the periodic intervals P, and the processor B adjusts the set count value Cs so as to synchronize tasks T of the processor A and tasks K of the processor B.

In the variation described here, by causing the processor A to adjust the upper-limit count value Cf, tasks T of the processor A and tasks K of the processor B are synchronized.

The configuration of a real-time distributed system of this variation is the same as that of FIGS. 5-9. The operations of the processors 12A and 12B until time T2 of FIG. 12 are the same as those described above.

In this variation, the processor 12A previously stores information about the operating frequency fb of the processor 12B. The operating frequency fb is defined as the reciprocal of the count period of the H/W timer 23a of the processor 12B.

The processor 12B obtains the counter value C1 taken at time T1 of FIG. 12, and the counter value C2 taken at time T2b (or the upper-limit count value Cf at time T2a). The processor 12B sends the counter values C1 and C2 to the processor 12A.

The processor 12A calculates $C3=(Cf-C1)+(C2-C0)$. The difference value C3 indicates a period of time for which data of a task T of the processor 12A is retained in the processor 12B until a task K is executed. Note that the value of C3 is a count value based on the count period of the H/W timer 23a of the processor 12B.

The processor 12A calculates the value of $C4=C3 \cdot (fa/fb)$ using the previously stored information about the operating frequency fb of the processor 12B, and information about its own operating frequency fa. The value C4 is a value obtained by converting an actual time for which data is retained in the processor 12B into a count value in the H/W timer 23a of the processor 12A.

The processor 12A changes the upper-limit count value Cf such that a task T is executed and data is sent a period of time corresponding to the value C4 later. More details are described as follows.

Note that the original upper-limit count value is represented by Cf0.

The processor 12A changes the upper-limit count value Cf to $Cf=Cf0+C4$. As a result, the H/W timer 23a of the processor 12A counts longer by a period of time corresponding to the value C4. Thereafter, once the timer counter 30 has reached the upper-limit count value Cf, the processor 12A changes the upper-limit count value Cf back to Cf0. As a result, the timer counter 30 after the upper-limit count value Cf has been changed twice is compared with the timer counter 30 before the changing. Time at which the timer counter 30 after the changing overflows is delayed from the overflow time before the changing, by a period of time corresponding to the count value C4. The delay corresponds to the difference value C3 of the processor 12B. The processor 12B receives data a period of time corresponding to the difference value C3 later, and therefore, can execute a task T immediately after receiving data.

(Variation 2) In the above example, tasks T of the processor A and tasks K of the processor B are executed at the same periodic intervals P. However, the present disclosure is applicable even to the case where the execution period of tasks T is different from the execution period of tasks K. More specifically, the present disclosure is applicable to the case where the execution interval P2 of tasks K is a multiple of the execution interval P1 of tasks T.

In this case, the processor 12B obtains time at which data has just been received the processor 12A.

Thereafter, by performing a process similar to the above process, the timer counter 30 of the processor 12B is advanced by a period of time corresponding to the time difference L between time at which data is received and time at which the execution of a task K is started in the processor 12B.

Unless this variation is applied, the control cycle of the processor 12B is P1+P2+D. The reason why the control cycle P of the processor 12A is included, is that data from the processor 12A is used, and therefore, the control cycle P of the processor 12A affects the processor 12B.

Meanwhile, in this variation, the control cycle of the processor B can be P2+D. Note that the execution interval of the processor B may be the interval P2 that is equal to the interval P1 or an integer multiple of the interval P1. The interval P2 includes the interval P1.

(Example Applications) Example applications including the above real-time distributed system 1 will now be described. In the example applications, the processor B may adjust the set count value Cs so as to synchronize tasks of the processor A and tasks of the processor B, or alternatively, as in Variation 1, the processor A may adjust the upper-limit count value Cf so as to synchronize tasks of the processor A and tasks of the processor B. Furthermore, as in Variation 2, tasks of the processor A and tasks of the processor B may have different execution periods.

Figure 13:
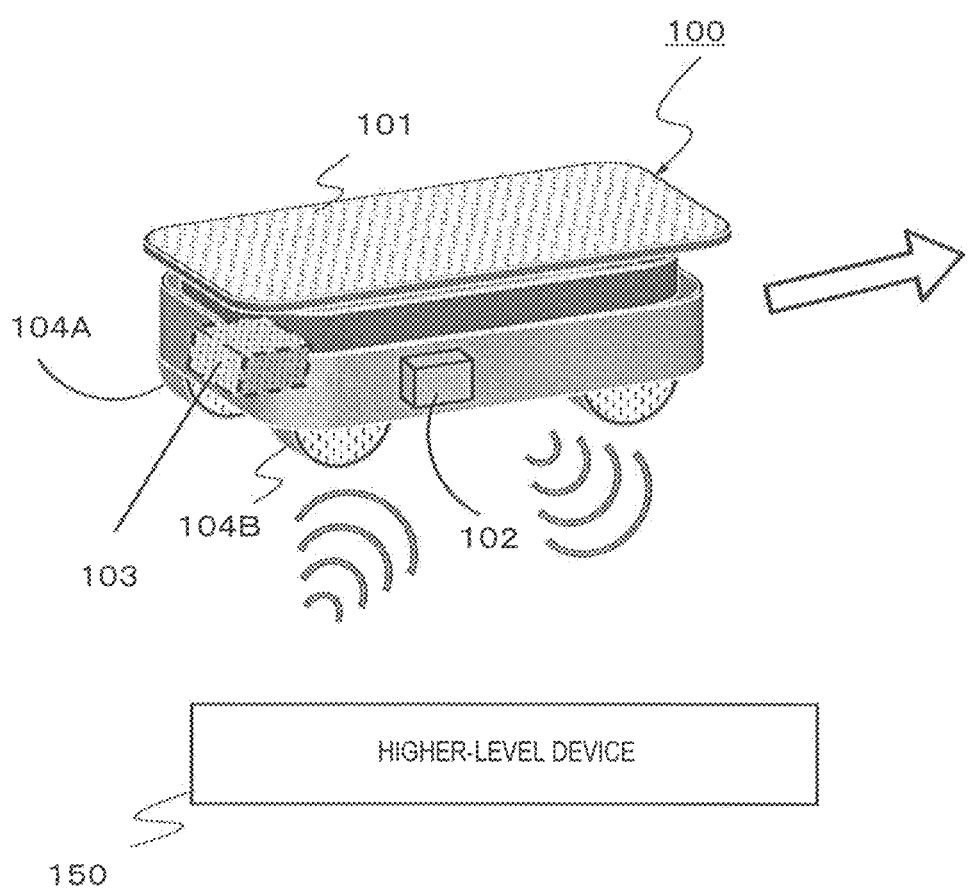
FIG. 13 is a diagram showing a configuration of a self-propelled robot 100.

FIG. 13 shows a configuration of a self-propelled robot 100. The self-propelled robot 100 has a transfer table 101, a system controller 102, a motor drive system 103, and two driven wheels 104A and 104B.

The transfer table 101 is used for placing an object to be transported.

The system controller 102 controls the direction and speed of movement of the self-propelled robot 100 according to instructions received wirelessly or by wire from a higher-level device 150. Specifically, the system controller 102 determines the speed and direction of rotation of each of the two driven wheels, i.e., the left wheel 104A and the right wheel 104B, and sends a control signal to the motor drive system 103.

The motor drive system 103 collectively refers to two systems (a left-wheel control system and a right-wheel control system). The motor drive system 103 controls the speeds and directions of rotation of the two driven wheels 104A and 104B, separately, according to a control signal from the system controller 102. Note that the combination of the system controller 102 and the motor drive system 103 may be referred to as a motor control system 105.

Figure 14:
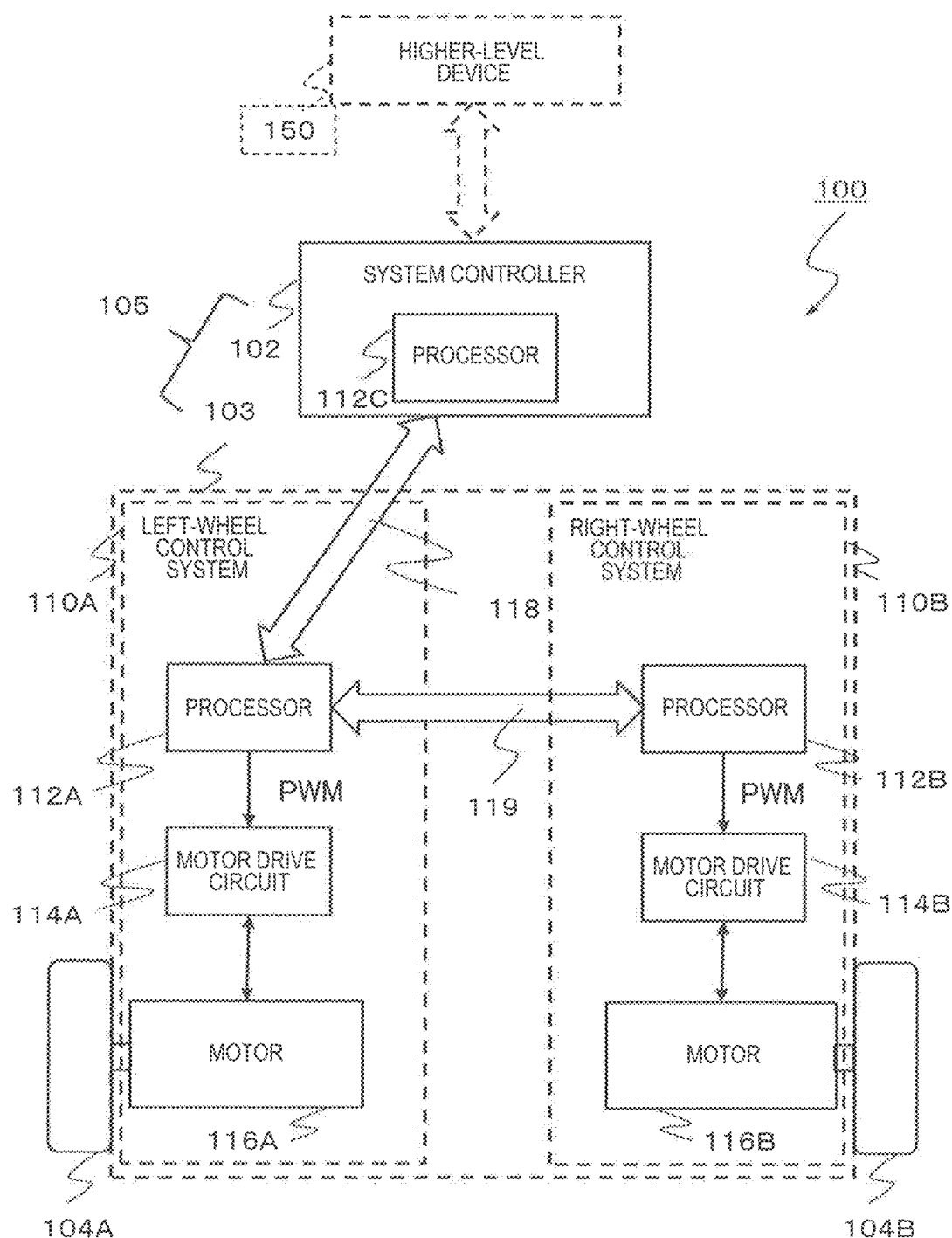
FIG. 14 is a diagram showing a hardware structure of the self-propelled robot 100.

FIG. 14 shows a hardware structure of the self-propelled robot 100. For the sake of clarity, the higher-level device 150, which is not included in the self-propelled robot 100, is indicated by a dashed line.

The system controller 102 has a processor 112C. The processor 112C has the hardware structure of FIG. 6. Therefore, the processor 112C will not be described in detail.

The motor drive system 103 is equivalent to the real-time distributed system 1 of FIG. 5. The motor drive system 103 has a left-wheel control system 110A and a right-wheel control system 110B. The left-wheel control system 110A has a processor 112A, a motor drive circuit 114A, and a motor 116A. The right-wheel control system 110B has a processor 112B, a motor drive circuit 114B, and a motor 116B. In this embodiment, the processor 112A and the processor 112B are assumed, but do not necessarily need, to be a product of the same model number of the same manufacturer. This is also true of the motor drive circuit 114A and the motor drive circuit 114B, and the motor 116A and the motor 116B. These components only need to have a function or performance required by the self-propelled robot 100. The left-wheel control system 110A and the right-wheel control system 110B may also each be called an intelligent motor.

A wireless or wired control communication line 118 is provided between the processor 112C of the system controller 102 and the processor 112A of the motor drive system 103. A control signal is transmitted from the processor 112C to the processor 112A via the control communication line 118.

A wired or wireless communication line 119 is provided between the processor 112A and the processor 112B. A control signal for the right-wheel control system 110B is transmitted from the processor 112C to the processor 112B via the processor 112A.

In the example described with reference to FIGS. 5-11, tasks T of the processor 12A and tasks of the processor 12B of FIG. 5 are synchronized.

In this example application, two synchronization processes (1) and (2) are successively executed. In the synchronization process (1), tasks that are executed by the processor 112C of the system controller 102, and tasks that are executed by the processor 112A of the left-wheel control system 110A, are synchronized. An operation mode in which the synchronization process (1) is executed may be referred to as a system synchronization mode. After the system synchronization mode is completed, the synchronization process (2) is executed, in which tasks of the processor 112A of the left-wheel control system 110A and tasks of the processor 112B of the right-wheel control system 110B are synchronized. The self-propelled robot 100 may not be provided with a communication line for direct communication that is used to synchronize tasks of the system controller 102 and tasks of the right-wheel control system 110B.

The above synchronization processes (1) and (2) are both the same as that described above with reference to FIGS. 5-11. Specifically, in the synchronization process (1), the processors 112C and 112A of FIG. 14 may operate like the processors 12A and 12B of FIG. 5. In the synchronization process (2), the processors 112A and 112B of FIG. 14 may operate like the processors 12A and 12B of FIG. 5. At least one of the synchronization processes (1) and (2) may be the process of Variation 1 or 2. Alternatively, the synchronization process (1) may be one of the processes of Variations 1 and 2, and the synchronization process (2) may be the other process.

After the synchronization process (1) is completed, the synchronization process (2) is executed, so that tasks of the processor 112C and tasks of the processor 112A are synchronized, and tasks of the processor 112A and tasks of the processor 112B are synchronized. In both of the synchronized states, a period of time between time at which data is received and time at which a task is executed is within the allowable time. Therefore, the processors 112A and 112B can output a PWM signal to the motor drive circuits 114A and 114B, respectively, and thereby control the rotation of each of the left and right wheels at the speed and direction of rotation specified by the system controller 102. As a result, the system controller 102 allows the self-propelled robot 100 to travel straight at a desired speed, and turn right or left at a desired speed and turning radius.

In the above example, it is assumed that the two rear wheels are a driven wheel. This is merely illustrative. For example, the present disclosure is also applicable to a two-wheel vehicle having a front and a rear wheel that are driven by separate motors, and a three-wheel and a four-wheel vehicle, etc., having a plurality of wheels driven by separate motors. Furthermore, the present disclosure is applicable to a motor control system in which the operation of a motor drive system having a single motor is controlled by a system controller. For example, in a motor control system in which only the rear wheel of a two-wheel vehicle is driven by a motor, the above synchronization process may be executed between the processor of a system controller and the processor of a motor drive system.

Figure 15:
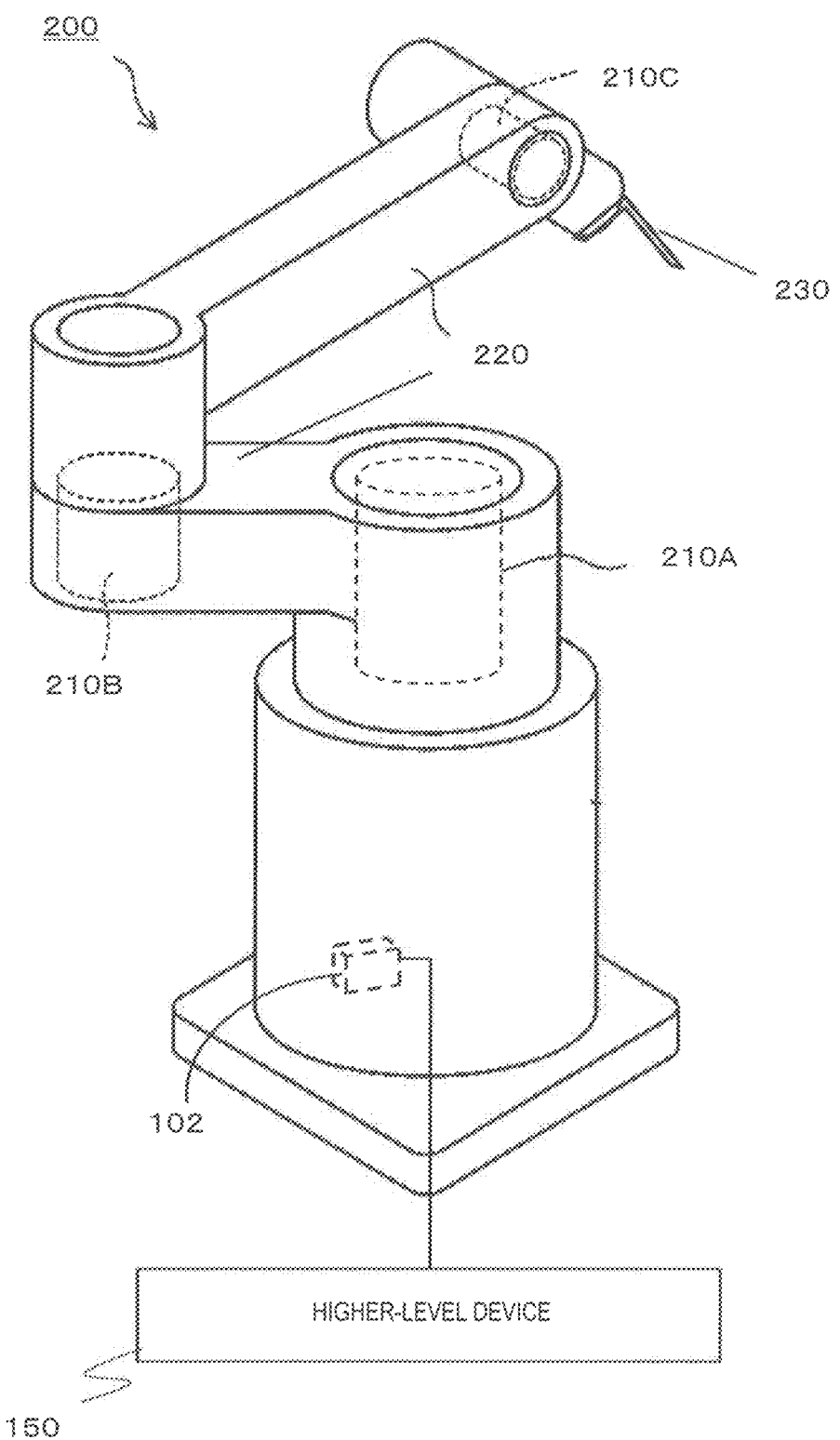
FIG. 15 is a diagram showing a configuration of a welding robot 200.

FIG. 15 shows a configuration of a welding robot 200. The welding robot 200 includes a system controller 102, a first-joint control system 210A, a second-joint control system 210B, a third-joint control system 210C, and a welding torch 230.

The welding robot 200 has a plurality of joints that can each be rotated by a motor. The motions of the joints are separately controlled by the first- to third-joint control systems 210A-210C. The system controller 102 and the first- to third-joint control systems 210A-210C are connected in cascade in that order.

The first- to third-joint control systems 210A-210C each operate using a control signal received from the system controller 102 and/or data output from a joint control system located upstream of itself. Specifically, the first- to third-joint control systems 210A-210C each rotate the corresponding motor at an appropriate rotational speed, and stop the motor at a desired angle using the data. As a result, the welding torch 230 can be moved to a position where welding is to be performed. Note that the first- to third-joint control systems 210A-210C each receive control data via a communication line (not shown) laid in an arm 220.

Figure 16:
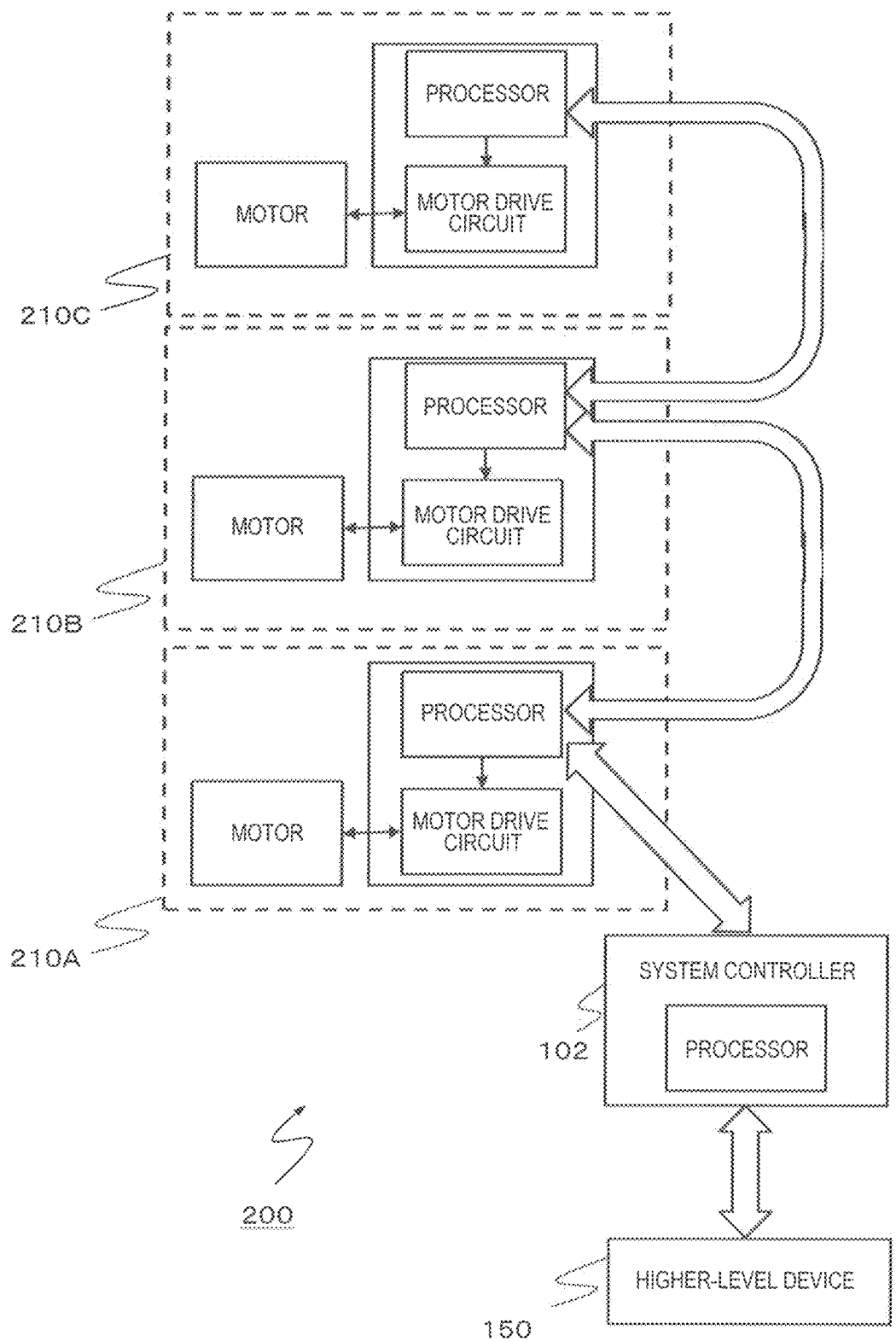
FIG. 16 is a diagram showing a hardware structure of the welding robot 200.

FIG. 16 shows a hardware structure of the welding robot 200. The structure of FIG. 16 has the same system controller 102 as that of the structure of FIG. 14. The first-joint control system 210A and the second-joint control system 210B correspond to the left-wheel control system 110A and the right-wheel control system 110B. The welding robot 200 additionally includes the third-joint control system 210C.

A synchronization process executed between the system controller 102 and the first-joint control system 210A is the same as the synchronization process executed between the system controller 102 and the left-wheel control system 110A of FIG. 14. A synchronization process executed between the first-joint control system 210A and the second-joint control system 210B is the same as the synchronization process executed between the left-wheel control system 110A and the right-wheel control system 110B of FIG. 14. A synchronization process executed between the second-joint control system 210B and the third-joint control system 210C is similar to the synchronization process executed between the left-wheel control system 110A and the right-wheel control system 110B of FIG. 14.

Therefore, more details will not particularly be described. Note that in FIG. 16, the system controller 102, the first-joint control system 210A, the second-joint control system 210B, and the third-joint control system 210C can also be referred to as a motor control system.

In any description of the present disclosure including the variations and example applications, the task execution period varies depending on an object to be controlled by a processor (FIG. 5). For example, in the case of the motor control, the task execution period is, for example, 1 msec when the rotational speed is controlled, and for example, 10 msec when the angle of rotation is controlled. Note that these values themselves may vary depending on characteristics of each individual motor.

Such a difference is clearly shown in the example applications of FIGS. 13-16. For example, in the case where the control cycle of a processor to control the rotation of a motor is represented by P, the control cycle of a processor of a system controller may be different from P. This will be described using the self-propelled robot 100, for example.

The processor 112C of the system controller 102 normally controls a location of the self-propelled robot 100. The processor 112C plans a location of the self-propelled robot 100 that is to be taken at each time, and based on these locations, calculates a speed request that is to be sent to a motor for each wheel at each time, and sends the speed request to the control system for each wheel. Thus, in this case, the processor 112C performs location control, and the control system for each wheel controls the rotational speed of the motor. The control cycles of the processor 112C and the control systems are determined based on characteristics of an object to be controlled. In general, the location control is executed at periodic intervals that are longer than those of the speed control. In other words, the control cycle of the processor 112C of the system controller 102 may be different from the control cycle of a processor to control the rotation of a motor. In such a case, the control described above in Variation 2 is effective.

According to the foregoing, the illustrative motor drive system of the present disclosure includes a first motor unit having a first motor and a first processor to control the first motor, and a second motor unit having a second motor and a second processor to control the second motor. The first motor unit and the second motor unit are connected together by a communication line. The first processor sends data via the communication line at regular intervals P1. The second processor receives the data via the communication line at the regular intervals P1 from first time. The second processor executes a task operating based on the data at regular intervals P2 from second time as a starting point. In a synchronization mode, the second processor changes the second time to new second time that occurs within a predetermined allowable time from the first time. In a normal operation mode after the synchronization mode, the first processor sends data via the communication line at the regular intervals P1. The second processor executes the task operating based on the data at the regular intervals P2 from the new second time as a starting point.

The second motor unit further has a counter to increment or decrement a count value according to a predetermined clock. In the synchronization mode and the normal operation mode, the second processor sets time at which the counter reaches a predetermined count value, as the new second time. The second processor executes the task from the new second time as a starting point.

The counter increments or decrements the count value, starting with a set initial count value. In the synchronization mode, the second processor sets the initial count value based on a difference between the first time and the second time.

The second processor obtains a value by subtracting or adding a count value representing the difference between the first time and the second time from or to the predetermined value, and sets the obtained value as the initial count value.

The first processor and the second processor operate with different clock frequencies.

In the synchronization mode, the second processor verifies whether or not a task is activated within the predetermined allowable time from the first time, from the new second time as a starting point. If a task has been activated within the predetermined allowable time, the second processor sends a notification indicating the end of the synchronization mode to the first processor, and transitions to the normal operation mode.

The first processor executes a task and generates data as a result of the execution of the task at the regular intervals P1. Note that the intervals P1 and P2 may be the same.

The motor drive system of the present disclosure is useful for synchronizing task operation timings of a plurality of processors constituting a real-time distributed system which does not have a mechanism for synchronous communication, and thereby efficiently operating the entire system.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:
1. A motor drive system comprising:
   a first motor unit having a first motor and a first processor to control the first motor; and
   a second motor unit having a second motor and a second processor to control the second motor,
wherein
   the first motor unit and the second motor unit are connected together by a communication line,
   the first processor sends data via the communication line at regular intervals P1,
   the second processor receives the data via the communication line at the regular intervals P1 from first time,
   the second processor executes a task operating based on the data at regular intervals P2 from second time as a starting point,
   in a synchronization mode, the second processor changes the second time to new second time that occurs within a predetermined allowable time from the first time,
   in a normal operation mode after the synchronization mode, the first processor sends data via the communication line at the regular intervals P1, and the second processor executes the task operating based on the data at the regular intervals P2 from the new second time as a starting point.

2. The motor drive system of claim 1, wherein
the second motor unit further has a counter to increment or decrement a count value according to a predetermined clock,
in the synchronization mode and the normal operation mode, the second processor sets time at which the counter reaches a predetermined count value as the new second time, and
the second processor executes the task from the new second time as a starting point.

3. The motor drive system of claim 2, wherein
the counter increments or decrements the count value, starting with a set initial count value, and
in the synchronization mode, the second processor sets the initial count value based on a difference between the first time and the second time.

4. The motor drive system of claim 3, wherein
the second processor obtains a value by subtracting or adding a count value representing the difference between the first time and the second time from or to the predetermined value, and sets the obtained value as the initial count value.

5. The motor drive system of claim 1, wherein
the first processor and the second processor operate with different clock frequencies.

6. The motor drive system of claim 1, wherein
in the synchronization mode, the second processor verifies, from the new second time as a starting point, whether or not a task is activated within the predetermined allowable time from the first time, and if a task has been activated within the predetermined allowable time, sends a notification indicating the end of the synchronization mode to the first processor, and transitions to the normal operation mode.

7. The motor drive system of claim 1, wherein
the first processor executes a task and generates data as a result of the execution of the task at the regular intervals P1.

8. The motor drive system of claim 1, wherein
the intervals P1 and P2 are the same.

9. A motor drive system comprising:
a first motor unit having a first motor and a first processor to control the first motor; and
a second motor unit having a second motor and a second processor to control the second motor,
wherein
the first motor unit and the second motor unit are connected together by a communication line,
in a synchronization mode, the first processor sends data via the communication line at first time,
in the synchronization mode, the second processor sends, via the communication line, information indicating second time at which the second processor receives the data and third time at which the second processor starts executing a task operating based on the data,
in the synchronization mode, the first processor changes the first time to new first time obtained by delaying the first time by a period of time corresponding to a difference between the second time and the third time, based on previously stored information about an operating frequency of the second processor, and information indicating the second time and the third time, and
in a normal operation mode after the synchronization mode, the first processor sends data via the communication line at regular intervals P1 from the new first time as a starting point, and the second processor receives the data at regular intervals P2 via the communication line and executes the task.

10. A motor control system comprising:
the motor drive system of claim 1; and
a system controller having a third processor,
wherein
the first processor of the motor drive system and the third processor are connected together by a control communication line,
prior to the synchronization mode of the first processor and the second processor, a synchronization mode and a normal operation mode of the third processor and the first processor are started,
the third processor sends data via the control communication line at regular intervals P3,
the first processor receives the data via the control communication line at the regular intervals P3 from first time,
the first processor executes a task operating based on the data at the regular intervals P1 from second time as a starting point,
in the system synchronization mode, the first processor changes the second time to new second time that occurs within a predetermined allowable time from the first time,
in a normal operation mode after the system synchronization mode, the third processor sends data via the control communication line at the regular intervals P3, and the first processor executes the task operating based on the data at the regular intervals P1 from the new second time as a starting point.

11. A self-propelled robot comprising:
the motor control system of claim 10;
a plurality of wheels including a first wheel driven by the first motor and a second wheel driven by the second motor; and
a transfer table to place an object on.

12. A motor control system comprising:
a system controller having a first processor; and
a motor unit having a motor and a second processor to control the motor,
wherein
the system controller and the motor unit are connected together by a communication line,
the first processor sends data via the communication line at regular intervals P1,
the second processor receives the data via the communication line at the regular intervals P1 from first time,
the second processor executes a task operating based on the data at regular intervals P2 from second time as a starting point,
in a synchronization mode, the second processor changes the second time to new second time that occurs within a predetermined allowable time from the first time, and
in a normal operation mode after the synchronization mode, the first processor sends data via the communication line at the regular intervals P1, and the second processor executes the task operating based on the data at the regular intervals P2 from the new second time as a starting point.

* * * * *